R. G. PARSONS.
CLAMP.
APPLICATION FILED MAR. 26, 1919.
1,362,540.
Patented Dec. 14, 1920.
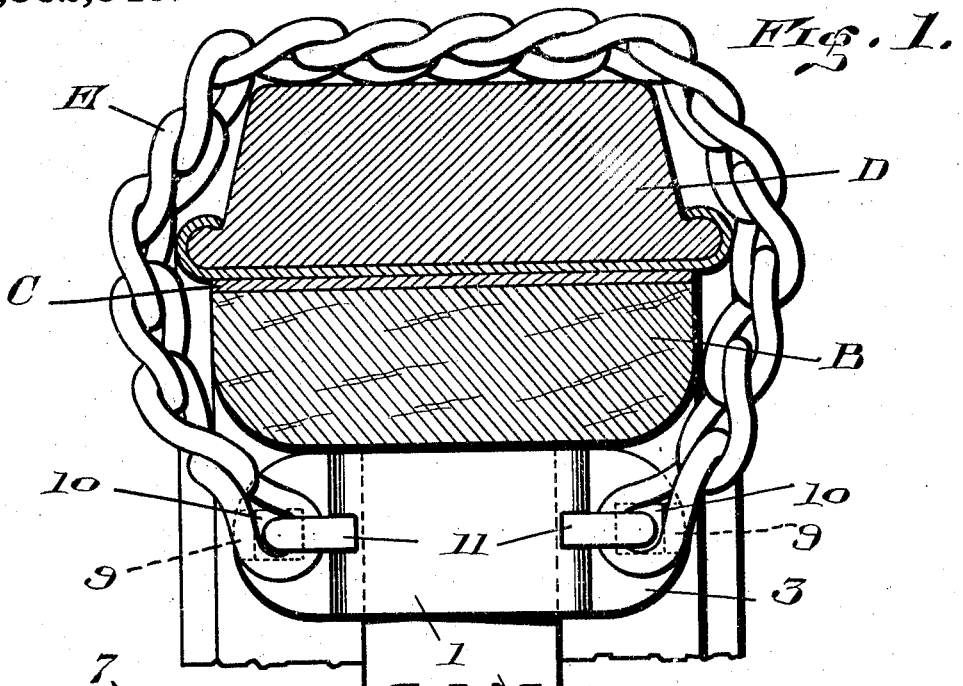
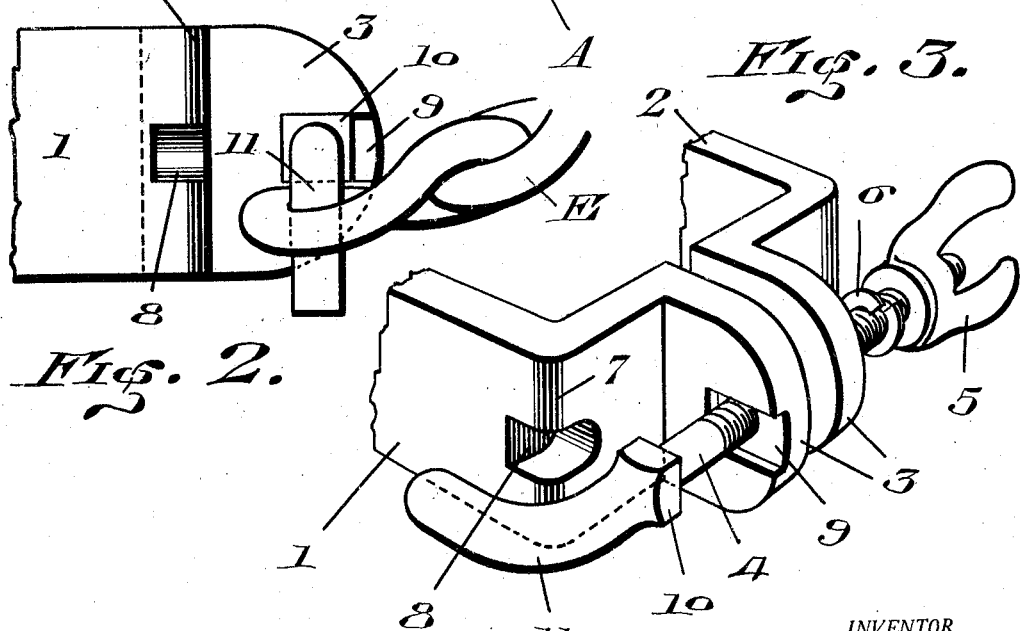
WITNESS:
Thos. W. Riley
INVENTOR.
Robert G. Parsons
BY Wm. H. Babcock & Son
ATTORNEYS

UNITED STATES PATENT OFFICE.

ROBERT G. PARSONS, OF PLANTSVILLE, CONNECTICUT, ASSIGNOR TO THE STEEL PRODUCTS COMPANY, OF HARTFORD, CONNECTICUT, A CORPORATION OF CONNECTICUT.

CLAMP.

1,362,540.

Specification of Letters Patent.   Patented Dec. 14, 1920.

Application filed March 26, 1919. Serial No. 285,139.

*To all whom it may concern:*

Be it known that I, ROBERT G. PARSONS, a citizen of the United States, residing at Plantsville, in the county of Hartford and State of Connecticut, have invented certain new and useful Improvements in Clamps, of which the following is a specification.

This invention relates to clamps to be used as one of the elements of an anti-skidding or traction unit of the fixed point or anchored type and resides especially in the combination of the plates of the clamp with the means for fastening the same together whereby securing means are provided for anchoring the terminal portions of the traction element *per se* to the clamp.

The objects in view are to provide a strong, reliable structure of this nature adapted especially for the above purpose; to dispense with all separable connectors for connecting the traction element or chain to the clamp, to simplify the construction and reduce the number of parts, and to so construct and arrange the parts that in arranged relation on the wheel none of the parts of the clamp will extend laterally beyond planes passing through the side edges of a radially outer peripherally extending part or element so as to be protected by the latter against injury by curbing and other objects in or on the road bed.

In the accompanying drawings, in which only one form is shown by way of illustration:

Figure 1 represents a transverse sectional view taken through the tire, rim and felly of a wheel with a unit embodying my invention applied thereto, the spokes being broken away;

Fig. 2, a detail view of one end portion of the primary plate and the securing means, the latter being in open or receiving position; and Fig. 3, a detail perspective view of one end portion of the clamp, broken away, the parts being loosened up for purposes of more complete illustration.

Referring now in detail to the drawings, A indicates the spokes, B the felly, C the rim, D the tire and E the traction element, a cross-chain being shown for purposes of illustration.

The clamp consists of a primary plate 1 and a complementary plate 2 having an inner configuration conforming to the cross-sectional form of the spoke to which they are to be applied. These plates are provided with perforated end flanges 3 adapted to receive bolts 4 on which the nuts 5 are to be turned to draw said plates tight on the spoke, washers 6 being interposed on the bolts 4 between the nuts 5 and the faces of the end flanges 3 of the complementary plate 2.

Both of said plates, intermediate the flanges 3, have bayed portions, angular in shape in the form illustrated, and it is essential that the primary plate 1 should have a projecting part 7 extending from the face of each flange 3 and provided with a recess 8, and it is highly desirable that the face of each flange 3 of said plate should have a recess 9 eccentric to the perforation therethrough, or that the latter should be angular.

The head 10 of each bolt 4 is angular in shape to fit in the corresponding recess 9 of its flange 3 to be thereby prevented from turning and also to bear on the said flange to force that end of the primary plate 1 toward the corresponding end of the complementary plate 2.

From this head 10 a hook 11 projects, being of such length, size and shape, and so arranged, that in normal position its tip will be received in its corresponding recess 8 formed in the wall of the part 7, which in the present instance forms one of the walls or faces of the bayed part of the primary plate 1.

As above indicated it is desirable that the bolt should have engagement at two points, at an interval from each other, to prevent any turning movement thereof, as illustrated, as in the use primarily in view, the leverage exerted is often very severe.

The bolts will be formed, as illustrated, with the hooks 11, heads 10 and shanks 4 all in one integral part.

In operation, to apply the terminal portion of a traction element the nut 5 will be loosened and the bolt shoved in the direction of the hook 11 until the head 10 is free of the walls of recess 9 and the tip of the hook 11 is free of the walls of recess 7, so that the bolt may be freely turned to, for instance, the position shown in Fig. 2, when the terminal portion or link will be applied to the hook 11 and the bolt turned back to its normal position and shoved in the direction of the nut 5 until the tip of hook 11 and head 10 are seated in their respective recesses 7 and 9, when the nut 5 is to be turned in the correct direction to draw the plates 1 and 2 tightly together on the spoke A.

Having thus described my invention, what I claim as new and desire to secure by Letters Patent is:

1. A clamp having plate members, one of said members having a projecting angularly recessed part and a recessed perforated flange, and another of said plates having a perforated flange, in combination with means passing through said perforated flanges for holding said flanges together and provided with a projection and an enlarged portion fitting respectively in said recesses.

2. A clamp consisting of a primary plate and a complementary plate, both of said plates having perforated end flanges, and the primary plate having a recessed part projecting from a point adjacent each flange, in combination with bolts passing through said flanges and nuts turning on the respective bolts to draw said plates toward each other, each of said bolts having an enlargement to engage the surface of its respective flange of the primary plate for the foregoing purpose and provided with a projecting hook, the tip of which, in normal position, fits into the recess of its respective recessed part to form a closed eye when in normal position to anchor one terminal portion of an additional element.

3. A clamp consisting of a primary plate and a complementary plate, both of said plates having perforated end flanges, and the primary plate having its flanges recessed eccentrically of the perforations therein and being provided with parts projecting from a point adjacent each flange, in combination with bolts passing through said flanges and nuts turning on the respective bolts to draw said plates toward each other, each of said bolts having an enlargement corresponding in cross-sectional form to the recess in its respective flange of the primary plate and fitting therein, in normal position, to prevent the turning movement of the bolt, and provided with a projecting hook, the open end of which, in normal position, is closed by the material of the adjacent projecting part, said hook being adapted to anchor the terminal portion of an additional element.

In testimony whereof I have signed my name to this specification in the presence of two subscribing witnesses.

ROBERT G. PARSONS.

Witnesses:
 WARREN D. CHASE,
 LESLIE B. POWELL.